(12) United States Patent
Rättö

(10) Patent No.: US 6,798,844 B2
(45) Date of Patent: Sep. 28, 2004

(54) CORRECTION OF PHASE AND AMPLITUDE IMBALANCE OF I/Q MODULATOR

(75) Inventor: Mika Rättö, Espoo (FI)

(73) Assignee: Nokia Networks Oy, Espoo (FI)

( * ) Notice: Subject to any disclaimer, the term of this patent is extended or adjusted under 35 U.S.C. 154(b) by 281 days.

(21) Appl. No.: 09/962,220

(22) Filed: Sep. 26, 2001

(65) Prior Publication Data

US 2002/0015450 A1 Feb. 7, 2002

Related U.S. Application Data

(63) Continuation of application No. PCT/FI00/00246, filed on Mar. 24, 2000.

(30) Foreign Application Priority Data

Mar. 26, 1999 (FI) .................................. 990678

(51) Int. Cl.[7] .......................... H04K 1/02; H04L 25/03; H04L 25/49
(52) U.S. Cl. ...................................... 375/296; 455/126
(58) Field of Search ................................ 375/295, 296, 375/285, 261, 298, 224; 455/284, 283, 126, 116, 115

(56) References Cited

U.S. PATENT DOCUMENTS

| | | | |
|---|---|---|---|
| 4,926,443 A | | 5/1990 | Reich |
| 4,930,141 A | | 5/1990 | Ohmagari |
| 5,054,037 A | | 10/1991 | Martineau et al. |
| 5,262,734 A | | 11/1993 | Dent et al. |
| 5,293,406 A | * | 3/1994 | Suzuki ........................ 375/295 |
| 5,699,383 A | | 12/1997 | Ichiyoshi |
| 5,732,333 A | * | 3/1998 | Cox et al. .................... 455/126 |
| 5,793,800 A | | 8/1998 | Jylhae et al. |
| 5,883,551 A | | 3/1999 | Marchesani et al. |
| 5,990,738 A | * | 11/1999 | Wright et al. ............... 330/149 |
| 6,009,317 A | * | 12/1999 | Wynn .......................... 455/296 |
| 6,054,894 A | * | 4/2000 | Wright et al. ............... 330/149 |
| 6,054,896 A | * | 4/2000 | Wright et al. ............... 330/149 |
| 6,188,732 B1 | * | 2/2001 | Rha ............................. 375/297 |
| 6,304,140 B1 | * | 10/2001 | Thron et al. ................. 330/149 |
| 6,313,703 B1 | * | 11/2001 | Wright et al. ............... 330/149 |
| 6,330,290 B1 | * | 12/2001 | Glas ............................ 375/324 |
| 2002/0021764 A1 | * | 2/2002 | Posti ........................... 375/296 |

FOREIGN PATENT DOCUMENTS

| | | |
|---|---|---|
| EP | 503 588 | 9/1992 |
| EP | 598 585 | 5/1994 |
| EP | 608 577 | 8/1994 |
| EP | 658 975 | 6/1995 |
| EP | 797 294 | 9/1997 |
| WO | WO 98/51047 | 11/1998 |

OTHER PUBLICATIONS

Cavers, "New Methods for Adaptation of Quadrature Modulators and Demodulators in Amplifier Linearization Circuits," IEE Transactions on Vehicular Technoloyg, vol. 46, No. 3, Aug. 1997, pp. 707–716.

* cited by examiner

Primary Examiner—Jean B. Corrielus
(74) Attorney, Agent, or Firm—Pillsbury Winthrop LLP

(57) ABSTRACT

A method and an arrangement for determining correction parameters used for correcting phase and amplitude imbalance of an I/Q modulator in a transmitter comprising an I/Q modulator (7) and a corrector (4) for correcting the phase and amplitude imbalance caused by the I/Q modulator, the arrangement comprising means (9) for sampling the I/Q-modulated test signal to be transmitted, means (14) for A/D-converting the signal samples taken from the test signal, means (15) for I/Q-demodulating the signal samples digitally into I- and Q-feedback signals, means (17) for determining the phase and amplitude imbalance caused by the I/Q modulator on the basis of the I- and Q-feedback signals, and means (17) for determining the correction parameters of phase and amplitude on the basis of the determined phase and amplitude imbalance.

6 Claims, 2 Drawing Sheets

CORRECTION OF PHASE AND AMPLITUDE IMBALANCE OF I/Q MODULATOR

This a Continuation Application of International Application No. PCT/FI00/00246 which was filed on Mar. 24, 2000 in the English language.

BACKGROUND OF THE INVENTION

The invention relates to correction of phase and amplitude imbalance caused by an I/Q modulator in a transmitter.

In new radio systems, the scarcity of radio frequencies makes it necessary to use spectrum-efficient modulation methods. In Europe, a new radio system standard has been developed for PMR (Professional Mobile Radio) users, called TETRA (Terrestrial Trunked Radio). π/4-DQPSK (π/4-shifted Differential Quadrature Phase Shift Keying) has been selected as the modulation method of the system. As far as a transmitter is concerned, a drawback to the modulation method is the variation in the amplitude of the envelope of a radio frequency signal, which causes InterModulation (IM) in a nonlinear amplifier. The IM results spread the spectrum of a transmitted signal and thus tend to reduce the gain obtained from using the linear modulation method. The IM results cannot usually be filtered since they are formed extremely close to the desired signal. With constant-amplitude modulation methods, no spreading of the spectrum occurs; therefore, the signal can be amplified by a nonlinear amplifier.

A trunked PMR system, wherein different user groups share the same radio channels, has stringent requirements regarding adjacent channel interference caused by a transmitter. These requirements necessitate good linearity in the transmitter of the radio system used.

In a power amplifier, good linearity is only achieved with poor efficiency. However, the efficiency of portable equipment should be as high as possible for the operation time to be sufficient and in order not to waste battery capacity. In addition, at least relatively good efficiency is required of power amplifiers at base stations in order to avoid cooling problems. Sufficient efficiency and linearity can only be achieved by linearizing the transmitter.

If the nonlinearities of an amplifier were known in advance, it would be possible to form inverse functions of the nonlinearities to convert the input signal, whereby the nonlinearities would be cancelled. The characteristics of the amplifier do not, however, stay the same but they change due to, for example, aging, warming up, and according to the radio channel and power level used. In addition, amplifiers have individual differences. Linearization methods are needed that are capable of adjusting adaptively to changing conditions. Research has been conducted on many different linearization methods, and three have been found to possess characteristics suitable for practical radio systems. These methods are feedforward, Cartesian feedback and predistortion. A linearization method can also be adaptive.

Thus, if the nonlinear transfer function of the amplifier is known and if it does not vary as a function of time, the signal to be transmitted can be linearized by applying to the signal a suitable transfer function causing predistortion. Hence, the signal outputted from the amplifier can be made linear. This method is called predistortion. At baseband, for example, predistortion can be carried out by using a lookup table (LUT) into which are stored conversion parameters causing predistortion, i.e. predistortion parameters, in which case the conversion parameters to be used at a given time are selected on the basis of the amplitude of the signal to be predistorted.

In a predistortion system based on amplitude, distortion of the amplitude of a signal is assumed to be independent of the phase of the signal. An I/Q modulator in the transmitter, however, causes distortions dependent on the phase of the signal, which impoverish the performance of the predistortion system. An I/Q modulator operates on a quadrature modulation basis. It enables two independent signals to be combined in the transmitter and be transmitted on the same transmission band and the signals to be separated again at the receiver. The principle of quadrature modulation is that two separate signals, I and Q (Inphase and Quadrature phase), are modulated by using the same carrier wave frequency, but the phases of the carrier waves differ from each other in that the carrier wave of signal Q lags 90° the carrier wave of signal I. After modulation, the signals are summed. Thanks to the phase difference, the I- and Q-signals can be separated from each other when the sum signal is demodulated. The distortions cause errors in the mutual phase and amplitude balance of the I- and Q-signals. Typically, the amplitude imbalance caused by the I/Q modulator is few per cents (2 to 5%) and the angle error 2 to 3 degrees. Correction circuits with fixed correction parameters set therein have been used in connection with predistortion systems for correcting the distortion caused by the I/Q modulator. The problem is then manufacturability since each I/Q modulator requires unique parameters which must be set as early as during the production. In addition, the magnitude of the phase and amplitude imbalance caused by the I/Q modulator depends on the frequency, in which case when the frequency is changed, the fixedly-set correction does not necessarily work any longer. Another known solution has been disclosed in "New Methods for Adaptation of Quadrature Modulators and Demodulators in Amplifier Linearization Circuits" by Cavers, J. K. in IEEE Transactions on Vehicular Technology, Vol. 46, No. 3, August 1997, pp. 707 to 716. It discloses a system wherein the correction parameters are determined by comparing the output of an I/Q modulator with the input thereof. The solution requires, however, an additional feedback branch independent of the feedback branch of the predistorter, which results in a complex arrangement.

BRIEF DESCRIPTION OF THE INVENTION

An object of the invention is thus to provide a method and an arrangement implementing the method such that the above-mentioned problems can be solved. The objects of the invention are achieved by a method of determining correction parameters used for correcting the phase and amplitude imbalance of an I/Q modulator in a transmitter, which transmitter comprises an I/Q modulator for I/Q-modulating a signal to be transmitted and a corrector for correcting the phase and amplitude imbalance caused by the I/Q modulator according to the correction parameters, which method comprises the steps of feeding an I- and Q-test signal into the transmitter, and sampling the I/Q-modulated test signal to be transmitted, the method being characterized by further comprising the steps of A/D-converting the signal samples taken from the test signal to be transmitted, I/Q-demodulating the signal samples digitally into I- and Q-feedback signals, determining the phase and amplitude imbalance caused by the I/Q modulator on the basis of the I- and Q-feedback signals, and determining the correction parameters of phase and amplitude on the basis of the determined phase and amplitude imbalance.

The invention is based on the idea that the I/Q demodulation of the feedback signal is carried out digitally, whereby the I/Q demodulation does not cause phase or amplitude imbalance for the signal. The phase and amplitude imbalance caused by the I/Q modulator, and thus the correction parameters of correction feedback, can then be determined by means of the feedback signals since the feedback signals comprise phase and amplitude errors caused only by the I/Q modulator. An advantage of the method of the invention is that the feedback arrangement is simple. Furthermore, the same feedback branch can be used for determining the parameters of the predistorter and the corrector for the I/Q modulator. This considerably simplifies the structure of the predistortion system of the transmitter and, as fewer components are needed, also saves costs.

The invention further relates to an arrangement for determining correction parameters used for correcting phase and amplitude imbalance of an I/Q modulator in a transmitter, which transmitter comprises an I/Q modulator for I/Q-modulating a signal to be transmitted and a corrector for correcting the phase and amplitude imbalance caused by the I/Q modulator according to the correction parameters, which arrangement comprises means for sampling the I/Q-modulated test signal to be transmitted, which is formed from I- and Q-test signals fed into the transmitter, the arrangement being characterized by further comprising means for A/D-converting the signal samples taken from the test signal to be transmitted, means for I/Q-demodulating the signal samples digitally into I- and Q-feedback signals, means for determining the phase and amplitude imbalance caused by the I/Q modulator on the basis of the I- and Q-feedback signals, and means for determining the correction parameters of phase and amplitude on the basis of the determined phase and amplitude imbalance. Such an arrangement enables the advantages of the method of the invention to be achieved by a simple structure.

Preferred embodiments of the invention are disclosed in the dependent claims.

BRIEF DESCRIPTION OF THE DRAWINGS

The invention is now described in closer detail in connection with the preferred embodiments and with reference to the accompanying drawings, in which.

DETAILED DESCRIPTION OF THE INVENTION

Figure 1:
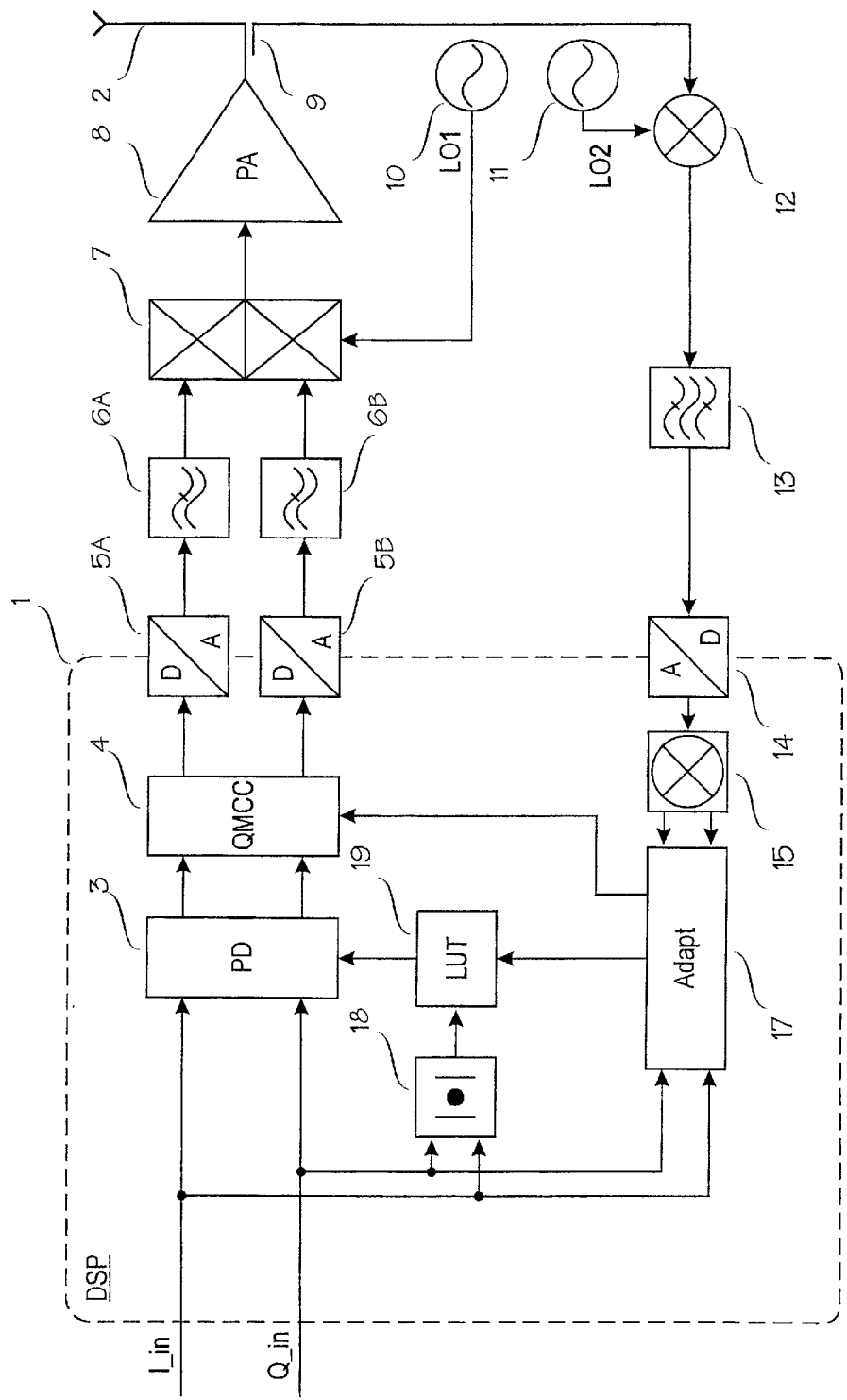
FIG. 1 is a block diagram of a transmitter of the invention according to a preferred embodiment thereof.

FIG. 1 is a block diagram of a transmitter of the invention according to a preferred embodiment thereof. It is to be noted that the figure shows only elements relevant for the invention to be understood. In the figure, I- and Q-signals I_IN and Q_IN to be transmitted are supplied to the transmitter. Predistortion carried out to cancel the nonlinearity of an amplifier 8 as well as correction of the phase and amplitude imbalance caused by an I/Q modulator lator 7 are implemented by a digital signal processor (DSP) 1. Predistortion and correction could also be implemented by e.g. an ASIC (Application-Specific Integrated Circuit) circuit; this, however, is irrelevant as far as the basic idea of the invention is concerned. Predistortion is carried out at a predisorter 3 according to correction parameters obtained from a lookup table 19. The predistorted signals are corrected at a correcting unit 4 of the I/Q modulator in order to compensate for the phase and amplitude imbalance caused by the I/Q modulator 7. D/A converters 5A and 5B D/A-convert the signals obtained from the correcting unit 4 into analogue signals, which are also preferably filtered by low-pass reconstruction filters 6A and 6B. These signals are further supplied to the I/Q modulator 7. The I/Q modulator 7 and an I/Q demodulator 15 operate on a quadrature modulation basis, which enables two independent signals to be combined at the transmitter and to be transmitted on the same transmission band, and the signal to be separated again at the receiver. The principle of quadrature modulation is that two separate signals, I and Q (Inphase and Quadrature phase), are modulated by using the same carrier wave frequency, but the phases of the carrier waves differ from each other in that the carrier wave of signal Q lags 90° the carrier wave of signal I. After modulation, the signals are summed. Thanks to the phase difference, the signals I and Q can be separated from each other when the sum signal is demodulated. The signals are modulated and combined at the I/Q modulator 7. The I/Q modulator operates synchronized by a local oscillator 10. The I/Q-modulated signal is supplied to a power amplifier PA8 and further to an antenna 2 to be transmitted. Simultaneously, feedback is formed by means of a sampling arrangement 9, such as a directional coupler. The radio frequency (e.g. 400 MHz) feedback signal is down-mixed to an intermediate frequency of 450 kHz, for example, preferably by a down-mixer 12. Down-mixing is carried out synchronized by a local oscillator 11. The intermediate-frequency signal can, if necessary, be filtered by a broadband filter 13, and also attenuated. The intermediate-frequency signal is sampled by an A/D converter 14 for baseband (or intermediate frequency) processing. This is preferably carried out by using undersampling (sampling frequency 162 kHz, for example); this, however, is irrelevant as far as the basic idea of the invention is concerned. Undersampling means that the signal to be sampled is sampled at a lower frequency than the Nyquist frequency. As is known, undersampling can be used if the band of the signal to be sampled is sufficiently restricted. The advantage of using undersampling in the A/D conversion 14 is, for example, that less memory is needed in the conversion than in normal sampling (or oversampling). In addition, the use of undersampling does not usually require additional procedures since the band of the signal supplied to the A/D converter is typically already restricted. The band of the signal can be restricted, if necessary, by potential passband filtering 13.

The I/Q demodulator 15 is implemented by a digital signal processor 1 (or by an ASIC circuit, for example). The A/D-converted intermediate-frequency feedback signal is I/Q-demodulated by digitally multiplying into baseband I- and Q-feedback signals by the I/Q demodulator 15. The I/Q demodulator is thus implemented by software at the digital signal processor 1. The digitally implemented I/Q demodulator 15 does not cause distortions to the signal, as an analogue I/Q demodulator would. The baseband I- and Q-feedback signals are conveyed to a computing unit 17 wherein the predistortion table 19 is generated. The manner in which the predistortion table 19 is generated is irrelevant to the invention. The computing unit 17 also receives signals I_IN and Q_IN supplied to the transmitter to be transmitted. The actual predistortion is carried out by means of the predistortion table 19. At a unit 18, an absolute value, i.e. the amplitude of the signal, is determined from a complex signal comprising signals I_IN and Q_IN. This amplitude data is fed to the amplitude predistortion table 19, which, on the basis of the amplitude data, gives the corresponding correction parameters to the predistorter 3. Being irrelevant to the basic idea of the invention, the predistortion method used may differ from the method disclosed above.

Figure 2:
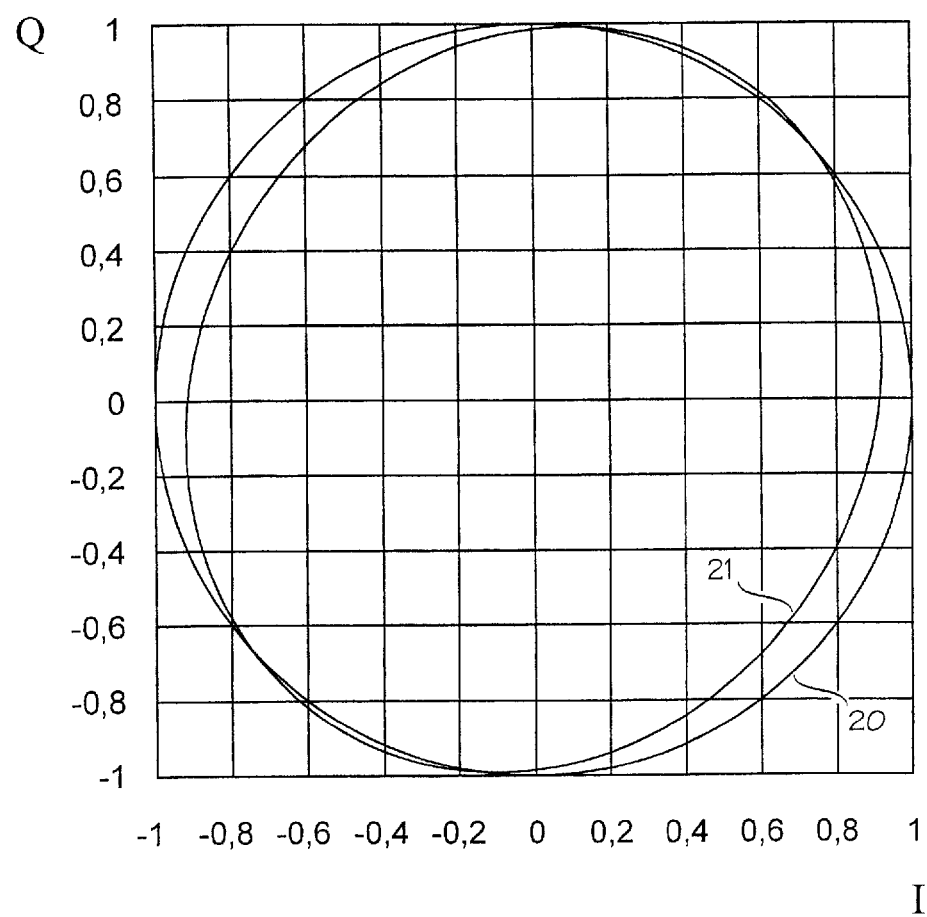
FIG. 2 shows, on an I/Q-plane, distortions caused by an I/Q modulator to a signal.

Regardless of how the above-described predistortion carried out to linearize the amplifier 8 has been implemented, the determination and correction according to the invention of the phase and amplitude imbalance caused by the I/Q modulator 7 is carried out in the following manner: a constant-envelope test signal, e.g. a sine signal, is fed to the transmitter such that there is a 90° phase shift between the signals of I- and Q-branches. The amplifier 8 is then retained in the linear operation range, in which case it does not distort the test signal travelling therethrough. Furthermore, when the digital I/Q demodulation 15 is used, which, as was already stated above, does not cause distortions to the signal, the phase and amplitude errors determined from the I-and Q-feedback signals supplied to the computing unit 17 are distortions caused by the I/Q modulator 7. FIG. 2 shows, on an I/Q-plane, a circle 20 formed from an ideal sine signal sequence (or an average of several sequences). The I/Q-plane refers to a common representation form of the I- and Q-signals wherein the values of the I- and Q-signals are presented by means of I- and Q-axes orthogonally positioned in regard to each other. The distortions caused by the I/Q modulator have been illustrated by an ellipse 21. It is to be noted that in the figure, the distortions have been exaggerated for an easier understanding. At the computing unit 17, the ellipse 21 corresponding to one signal sequence is determined from the I- and Q-feedback signals. The ellipse 21 can also be determined from several signal sequences by averaging, for example. Next, the distorted I- and Q-axes corresponding to the feedback signals are determined on the I/Q-plane by means of timing information: since the delay caused by feedback for the signal is known, and, on the other hand, the test signal fed to the transmitter is also known, the distorted I- and Q-axes can be determined from the I- and Q-feedback signals by means of this data. Next, the diameters of the ellipse 21 are measured in the direction of the distorted I- and Q-axes. Amplitude imbalance causes the ideal circle 20 to be stretched into the ellipse 21, whereby the amplitude imbalance can be determined from the relation between the diameters measured in the direction of the distorted I- and Q-axes. Phase imbalance, in turn, changes the angle between the I- and Q-axes, whereby the phase imbalance can be determined on the basis of the angle between the distorted I- and Q-axes. In other words, the magnitude of the phase imbalance is the angular value whose magnitude corresponds to the magnitude by which the angle between the distorted I- and Q-axes differs from the phase shift between the I- and Q-test signals.

When the phase and amplitude imbalance have been determined, the corresponding correction parameters are determined at the computing unit 17 and fed to the correcting unit 4. The form of the correction parameters is irrelevant to the invention, and so is the precise operation of the correcting unit 4. The correcting unit 4 can be symmetrical, in other words it corrects the phase and amplitude imbalance of both the I- and Q-branches. In such a case, there are typically four correction parameters: the correction parameters of the phase and amplitude of the I- and Q-branches. The correcting unit 4 can also be asymmetrical, in which case it corrects either the I-signal or the Q-signal only. The imbalance of the I- and Q-branch can be removed also by means of the asymmetrical correcting circuit 4, whereby only two correction parameters are needed, which reduces the need for calculation. A drawback to the asymmetrical correction is that the total amplitude of the signal may change as a result of the correction. By using the symmetrical correction circuit 4, the total amplitude does not change as a result of the correction.

The correction parameters can be updated at certain predetermined intervals, for example, or in response to a parameter or to an external request when, for example, the frequency used or some such factor changes. The TETRA system comprises a special linearization time slot reserved for linearizing the transmitter. Hence, in the TETRA system, it is during the linearization time slot when the correction parameters of the I/Q modulator 7 can be preferably determined.

Although the use of the invention has been described herein mostly in connection with the TETRA system, there are no restrictions to the use of the invention in systems of other type as well. The structure of the transmitter used may differ from the described one while the basic idea of the invention remains the same. It is obvious to those skilled in the art that the basic idea of the invention can be implemented in many ways as technology progresses. The invention and the embodiments thereof are thus not restricted to the examples described above but they can vary within the scope of the claims.

What is claimed:

1. A method of determining correction parameters used for correcting phase and amplitude imbalance of an I/Q (Inphase/Quadrature phase) modulator in a transmitter, which transmitter comprises the I/Q modulator for I/Q-modulating a signal to be transmitted and a corrector for correcting the phase and amplitude imbalance caused by the I/Q modulator according to the correction parameters, the method comprising:

feeding an I- and Q-test signal into the transmitter, wherein the I- and Q-test signals are sine signals having a phase shift of 90° between them;

sampling an I/Q-modulated test signal to be transmitted;

A/D-converting the signal samples taken from the test signal to be transmitted;

I/Q-demodulating the signal samples digitally into I- and Q-feedback signals;

determining an ellipse formed by one sequence or an average of several sequences of the I- and Q-feedback signals on an I/O-plane;

determining, on the basis of timing information, distorted I- and Q-axes corresponding to the I- and Q-feedback signals on the I/Q plane;

measuring the diameters of the ellipse in the direction of the distorted I- and Q-axes;

determining the amplitude imbalance from the relation between the diameters;

determining the phase imbalance from the angle between the distorted I- and Q-axes; and determining the correction parameters of phase and amplitude on the basis of the determined phase and amplitude imbalance.

2. The method of claim 1, wherein the determination of the correction parameters is performed at predetermined intervals.

3. The method of claim 1, wherein the determination of the correction parameters is performed during a linearization time slot.

4. An arrangement for determining correction parameters used for correcting phase and amplitude imbalance of an I/Q (Inphase/Quadrature phase) modulator in a transmitter, which transmitter comprises the I/Q modulator for I/Q-modulating a signal to be transmitted and a corrector for correcting the phase and amplitude imbalance caused by the I/Q modulator according to the correction parameters, the arrangement comprising:

sampling means for sampling an I/Q-modulated test signal to be transmitted, which is formed from I- and Q-test signals fed into the transmitter, wherein the I- and Q-test signals are sine signals having a phase shift of 90° between them;

A/D conversion means for A/D-converting the signal samples taken from the test signal to be transmitted;

I/Q demodulation means for I/Q-demodulating the signal samples digitally into I- and Q-feedback signals;

means for determining the phase and amplitude imbalance caused by the I/Q modulator, the means being arranged to:

determine an ellipse formed by one sequence or an average of several sequences of the I- and Q-feedback signals on an I/Q plane;

determine, on the basis of timing information, the distorted I- and Q-axes corresponding to the I- and Q-feedback signals on the I/Q plane;

measure the diameters of the ellipse in the direction of the distorted I- and Q-axes;

determine the amplitude imbalance from the relation between the diameters;

determine the phase imbalance from the angle between the distorted I- and Q-axes; and means for determining the correction parameters of phase and amplitude on the basis of the determined phase and amplitude imbalance.

5. The arrangement of claim 4, wherein the arrangement is arranged to determine the correction parameters at predetermined intervals.

6. The arrangement of claim 4, wherein the arrangement is arranged to determine the correction parameters during a linearization time slot.

* * * * *